United States Patent [19]
Sato

[11] Patent Number: 6,088,324
[45] Date of Patent: Jul. 11, 2000

[54] PREDICTION-BASED TRANSMISSION POWER CONTROL IN A MOBILE COMMUNICATIONS SYSTEM

[75] Inventor: Toshifumi Sato, Tokyo, Japan

[73] Assignee: NEC Corporation, Japan

[21] Appl. No.: 08/865,316

[22] Filed: May 29, 1997

[30] Foreign Application Priority Data

May 30, 1996 [JP] Japan .................................. 8-136262

[51] Int. Cl.[7] .............................. H04B 7/216; H04B 1/69
[52] U.S. Cl. .......................... 370/203; 370/335; 375/200
[58] Field of Search ................................ 370/203, 206, 370/207, 320, 335, 342, 441, 479, 252; 375/200, 206, 207

[56] References Cited

U.S. PATENT DOCUMENTS

| 5,412,686 | 5/1995 | Ling ......................................... | 375/200 |
| 5,629,934 | 5/1997 | Ghosh et al. ............................ | 370/335 |

*Primary Examiner*—Michael Horabik
*Assistant Examiner*—Kevin C. Harper
*Attorney, Agent, or Firm*—Ostrolenk, Faber, Gerb & Soffen, LLP

[57] ABSTRACT

A mobile communication system is arranged to have a code divisional multi access system as in the North America standard system and to control a transmission power for reducing an influence of interference of one channel to the other ones by lowering a control error of the electric power transmitted on an up line. In the base station, a receiving section 106 of a tranceiving unit 100 provides a pilot symbol in-phase adding circuit 113 for detecting a carrier signal point represented by an in-phase component and an quadrature component at regular intervals. The amplitude of the detected carrier signal point is corrected by an amplitude correcting circuit 114 by using the previous control values for transmission power 116 read from a memory 115. Then, a predicting circuit 117 predicts a carrier signal point at a time when the next control for transmission power is executed by using the corrected carrier signal point. The predicted carrier signal point is compared with a reference signal through a comparing circuit 119. Next, a transmission power control circuit 121 generates a control value for transmission power at a time when the next control for transmission power is executed, transmits the control value to the mobile devices, and store the control value in the memory 115. The mobile devices control the transmission power based on the control value.

18 Claims, 6 Drawing Sheets

PREDICTION-BASED TRANSMISSION POWER CONTROL IN A MOBILE COMMUNICATIONS SYSTEM

BACKGROUND OF THE INVENTION

The present invention relates to a mobile communication system which provides a transmission power control circuit for controlling transmission power, and more particularly to the mobile communication system which is suitable to a car phone or a portable phone provided with a direct spreading code divisional multi access system.

Conventionally, there have been known various kinds of systems as a cellular system for a car phone or a portable phone system. Those known systems include a Japanese standard system (PCD: RCR STD 27), a North America standard system (TIA IS54), and a European standard systems, these of which utilize a time divisional multi access (TDMA), and another North America standard system (TIA IS95) which utilizes a code divisional multi access (CDMA).

A cellular system that utilizes the code divisional multi access (CDMA) system is arranged so that two or more mobile phones are connected to one base station through carriers of one frequency. This cellular system is required to provide the base station with a channel transmission power control technique for keeping the signal powers from plural mobile phones identical with each other. This ground will be described below. For example, assume that the power received from one mobile phone is ten times so great as the power received from another mobile phone. The former mobile phone gives ten times as great a channel interference as another mobile phone to the power received from another mobile phone. In other words, the former mobile phone brings about the channel interference correspond to that of ten ordinary mobile phones. In a case that the power received from one mobile phone is ten times as great as that received from the other mobile phones, the number of mobile phones or channels to be connected to one base station at a time is reduced by nine, as compared with the case that the base station receives the same power from each of all mobile phones connected thereto.

The cellular system that utilizes the CDMA needs to control the transmission power so that the base station can receive the same power from each of the connected mobile phones. The malfunction of this control disadvantageously leads to greatly reducing the number of channels to be connected as system capacitance.

The control for a transmission power on an up link executed in the North America standard system that utilizes the code divisional multi access will be discussed in detail in the document ITA/EIA/IS-95-A, chapters 6 and 7 issued by TIA, for example. The transmission power of the mobile phone is controlled by an open loop power control or a closed loop power control. In the open loop power control, the mobile phone measures the received power on the down link, estimates a propagation loss based on a difference between the received power and the power sent by the base station, and decide a power to be transmitted by the mobile phone itself based on the propagation loss. ("Estimated Open Loop Output Power" of 6.1.2.3.1 of the document TIA/EIA/IS-95-A issued by TIA and "Open Loop Estimation" of 6.1.2.4.1 of this document). In this open loop power control, the down link has a different frequency from the up link, so that the down transmission loss does not necessarily coincide with the up transmission loss. Hence, only this open loop power control cannot minutely control the transmission power.

Turning to the closed loop power control, the base station measures the received power at a unit of a time slot of 1.25 ms and decide the magnitude of the received power on a reference value. At the succeeding slots of the down link, in a case that the base station decides the received power is greater than the reference value, the base station gives to the mobile phone an indication that the power to be transmitted by the mobile phone is changed by −1 dB. In a case that the base station decided the received power is smaller than the reference value, the base station gives to the mobile phone an indication that the power to be transmitted by the mobile phone is changed by +1 dB. In response to the indication about change of the transmission power from the base station, the mobile phone changes the transmission power at the next slot to the slot when the indication is given. (Refer to "Closed Loop Correction" of 6.1.2.4.2 of the document TIA/EIA/IS-95-A issued by TIA and "Power Control Subchannel" of 7.1.3.1.7 of this document.)

The North American standard system that utilizes the CDMA supports a variable rate speech vocoder (speech encoder). That is, at a normal telecommunication channel (TCM), the bit rate is 9600 bps, while at an interval where no speech takes place (voiceless interval), the bit rate is reduced from a half to a one-eighth for reducing the interference caused for another channel. Concretely, one frame of 20 ms is divided into 16 time slots, each length of which is 1.25 ms. Of these time slots, a half to a one-eighth time slots are selectively transmitted by using a pseudo random variable and the other time slots are not transmitted for implementing the transmission at a variable rate. The base station indicates the change of the transmission power according to the foregoing procedure irrespective of whether or not the transmission is done at the current time slot, while the mobile phone changes the transmission power according to only the indication for change of the transmission power for the time slot where the actual transmission is done.

As is obvious from the foregoing description, if the variation of a transmission loss, that is, fading or shadowing is gradually caused, the open loop power control and the closed loop power control can be used for controlling the power received from the mobile phone to the base station in the range of ±1 dB.

As described in the foregoing publication ("Reverse CDMA Channel Signals" of 6.1.3.1 of the document TIA/EIA/IS-95-A issued by the TIA), the up link is 64-ary-quadrature-modulated and asynchronously detected. Then, the resulting signal is subject to the RAKE combine and the antenna diversity combine. The received power is obtained by measuring these combined powers.

In the closed loop power control system used in the North America standard system provided with the CDMA as described above, when the base station measures the power transmitted by the mobile phone at the N-th slot, the base station gives to the mobile phone an indication about change of the transmission power at the (N+2)th slot, and then the mobile phone modifies the transmission power at the (N+3)th slot. That is, the control is delayed by three slots. Assuming that one slot is 1.25 ms, the control is delayed by 3.75 ms.

In this kind of control for the transmission power, if the variation of the transmission path is far slower than the control delay of 3.75 ms, that is, 1/267 Hz, this control is valid. If the variation is faster, this control for the transmission power is not valid. In particular, if a high frequency such as 2 GHz is used, the variation of the transmission path is likely to be faster. This may disable the control.

In the North America standard system that utilizes the CDMA, the control delay (3 slots=3.75 ms) is greater than the control period (1 slot=1.25 ms). Hence, when the transmission path is gradually varying, the oscillation takes place at four times as great a period as the control period (12 slots=15 ms). Further, when the transmission path is varying fast, the control disables to follow the fast variation. Hence, the power control disadvantageously gives rise to a greater error than no control for the transmission power.

Further, this system utilizes a variable rate service. As mentioned above, this disadvantage is made more remarkable if the intermittent transmissions are executed. As the number of slots to be thinned out is increased, the control interval is made longer, so that the control cannot follow the far faster variation of the transmission path.

The interleave and the error correction are effective if the fading is too fast for the closed loop power control to follow. In the North America standard system that utilizes the CDMA, therefore, the combination or the closed loop power control, the interleave and the error-correcting codes is used for keeping the constant receiving quality how fast the fading is. The combination of the interleave and the error-correcting codes is effective in improving the quality of a subject channel, while the combination does not lead to avoidance of the increase of the interference to the other channels resulting from the increase of the average transmission power caused by the control error of the transmission power.

It is an object of the present invention to provide a mobile communication system for controlling transmission power which is arranged to utilize the CDMA (Code Divisional Multi Access) as in the foregoing North America standard system and reduce the interference of the subject channel given to the other channels by reducing the control error of the transmission power on the up link.

It is a further object of the present invention to provide a mobile communication system for controlling transmission power which is arranged to suppress increase of a control error for transmission power against fast fading and an oscillating phenomenon against very gradual fading, suppress increase of a control error for transmission power against intermittent transmissions for a variable rate, reduce the interference given by the subject channel to the other ones, increase the number of channels used for a frequency band at a time, and increase the number of accommodatable users as a system capacitance.

SUMMARY OF THE INVENTION

According to a first aspect of the invention, a mobile communication system comprises: a base station having means for detecting a carrier signal point represented by an in-phase component and an quadrature component at regular intervals, means for correcting an amplitude of the carrier signal point detected by the detecting means according to previous transmission power control values, means for predicting a carrier signal point at a time point when next control for transmission power is executed by using the carrier signal point whose amplitude is corrected by the correcting means, means for comparing an electric power of the carrier signal point predicted by the predicting means with a predecided reference value, means for generating a control value for the transmission power at the time point when the next control for transmission power is executed, based on the compared result given by the comparing means, a memory for storing the control value for transmission power generated by the generating means and supplying the previous control values for transmission power to the correcting means, and means for transmitted and control value for transmission power; and a plurality of mobile devices; and a plurality of mobile devices which are connected to the base station through a radio wave of one frequency and are controlled to keep signal electric powers received by the base station identical with each other according to the control value for transmission power transmitted from the base station.

The mobile communication system prepares a carrier signal point detector for detecting a carrier signal point represented by the in-phase component and quadrature component and operates to correct an amplitude of the carrier signal point detected by the detector based on the previous power control values and predict a carrier signal point at the next power control based on the corrected amplitude through the offset of a predicting unit. Then, the power of the predicted carrier signal point is compared with the predecided reference value. The control value for the power at the next power control is generated on the compared result and then is transmitted to the mobile phone. With this operation, each mobile phone can control the transmission power so that all the powers received by the base station from the mobile phones are made equal to each other.

According to a second aspect of the invention, the mobile communication system according to the first aspect of the invention is characterized in that the means for detecting the carrier signal point is arranged to detect the carrier signal point by detecting pilot symbols inserted at regular periods.

According to a third aspect of the invention, the mobile communication system according to the first aspect of the invention is characterized in that the means for detecting the carrier signal point is arranged to detect the carrier signal point by detecting an M-valued quadraturely modulated data signal point. The M-ary quadrature modulation is a system for selecting one of M code series quadrature to each other according to the information to be transmitted and transmitting the selected one. If M is $2^m$, the m-bit information can be transmitted with one code. This is employed in the conventional North America standard system (TIA IS95).

According to a fourth aspect of the invention, the mobile communication system according to the first aspect of the invention is characterized in that the predicting means is arranged to derive the predicted value by interpolating amplitude corrected values of the latest received two carrier signal points.

According to a fifth aspect of the invention, the mobile communication system according to the first aspect of the invention is characterized in that the predicting means is arranged to derive the predicted value by performing a linear prediction of least squares with respect to amplitude corrected values of the latest received carrier single points.

According to a sixth aspect of the invention, the mobile communication system according to the first aspect of the invention is characterized in that the predicting means is arranged to derive the predicted value by performing a linear prediction of least squares with respect to amplitude corrected values of the latest received plural carrier signal points. That is, the mobile communication system according to the fifth aspect of the invention performs an approximation with a straight line where a root gum of errors is made minimum, while the mobile communication system according to the sixth aspect of the invention performs a minimum root prediction which does not normally brings about a linear approximation.

According to a seventh aspect of the invention, a mobile communication system comprises: a base station having means for detecting a carrier signal point composed of an in-phase component and an quadrature component of a path at regular intervals, the detecting means being prepared for each of plural paths of radio signals, means for correcting an amplitude of the carrier signal point detected by the detecting means according to previous control values for a transmission power, the correcting means being prepared for each of the paths and in correspondence to the detecting means, means for predicting a carrier signal point at a time when next control for the transmission power is executed by using the carrier signal point whose amplitude is corrected by the correcting means, the predicting means being provided in correspondence to each of the correcting means, means for combining electric powers of the carrier signal points predicted by the predicting means, means for comparing the electric power combined by the combining means with a predecided reference value, means for generating a control value for the transmission power at a time point when the next control for the transmission power is executed, based on the compared result given by the comparing means, a memory for storing the control value for the transmission power generated by the generating means and supplying the control value as the previous control values for the transmission power to the correcting means, and a control circuit for controlling the transmission power, the control circuit having means for transmitting the control value for the transmission power; and a plurality of mobile devices which are connected to the base station through radio waves of one frequency and are controlled to keep the signal electric powers received by the base station identical with each other according to the control value for transmission power transmitted from the base station.

The mobile communication system according to the seventh aspect of the invention concerns with a method for controlling transmission power in a case of performing the RAKE combine in the direct spreading code divisional multi access (DS-CDMA) system. In the mobile communication, a radio signal is reflected on objects such as buildings and mountains. That is, the radio signal reaches the receiver through multi paths. In the case of using the direct spreading code divisional multi access system, if a delay time difference between the paths is greater than one chip of a spreading code, the path can be separated. Hence, in the case of using the direct spreading code divisional multi access system, the RAKE combine (to be described later) is generally executed to enhance the receiving characteristic of each path. This mobile communication system provides the "carrier signal point detector", "amplitude corrector", and "predicting unit" located on each path. After the "synthesizer", the RAKE combine is executed. Just one combination of these components is necessary. This is the similar to the mobile communication system according to the first aspect of the invention.

According to an eighth aspect of the invention, a mobile communication system comprises: a base station having radio wave receiving means for receiving a signal of a radio band and converting the signal into a complex baseband signal, de-spreading means for extracting a signal of a subject channel by replicating diffuse codes of the complex baseband signal code-divided and multiplexed after the conversion, multiplexing and separating means for separating an output of the de-spreading means into pilot symbols and data symbols, means for performing an in-phase addition of the adjacent pilot symbols received in time series from the de-multiplexing means, for enhancing an S/N rato, means for correcting an amplitude of the in-phase added pilot symbol according to previous control values for transmission power, means for predicting a received signal point of the pilot symbol at a time when next control for transmission power is executed by the pilot symbol whose amplitude is corrected by the correcting means, means for comparing a received electric power of the pilot symbol predicted by the predicting means with a predecided reference value, means for generating the control value for transmission power at a time when the next control for transmission power is executed, based on the compared result given by the comparing means, a memory for storing the control value for transmission power generated by the generating means and supplying the control value as the previous control values for transmission power to the correcting means, and a circuit for controlling the transmission power, the circuit having means for transmitting the control value for transmission power; and a plurality of mobile device which are connected to the base station through radio waves of one frequency and are controlled to keep the signal electric power received by the base station identical with each other according to the control value for transmission power.

That is, the mobile communication system according to the eighth aspect of the invention is a further embodiment of the invention according to the second aspect of the invention.

According to a ninth aspect of the invention, a mobile communication system comprises: a base station having radio wave receiving means for receiving a signal of a radio band and converting the signal into a complex baseband signal, de-spreading means for extracting a signal of a subject channel by replicating diffuse codes of the complex baseband signal code-divided and multiplexed after the conversion, quadrature modulating means for calculating a corrolation value of the complex baseband signal with each of M quadrature codes (M is a positive integer), means for selecting one of the M correlation values so that the selected value gives rise to a maximum electric power, means for correcting an amplitude of the correlation value selected by the selecting means according to previous control values for transmission power, means for predicting a signal point at a time point when next control for transmission power is executed by the amplitude corrected correlation value, means for comparing an amplitude of the predicted signal point with a predecided reference value, means for generating a control value for transmission power at a time point when the next control for transmission power is executed, based on the compared result given by the comparing means, a memory for storing the control values for transmission power generated by the generating means and supplying the control values as the previous control values for transmission power to the amplitude correcting means, and a circuit for controlling the transmission power, the circuit having means for transmitting the control value for transmission power; and a plurality of mobile devices which are connected to the base station through radio waves of one frequency and are controlled to keep the signal electric powers received by the base station identical with each other according to the control value for transmission power transmitted by the base station.

That is, the mobile communication system according to the ninth aspect of the invention is a further embodiment of the invention according to the third aspect of the invention.

As set forth above, the mobile communication systems according to the first to the ninth aspects of the invention prepare a carrier signal point detector for detecting a carrier signal point represented by the in-phase component and the quadrature component at regular intervals and operate to correct the amplitude of the detected carrier signal point based on the previous control values for transmission power and to predict the carrier signal point at the next power control through the effect of the predicting unit. Then, the power at the predicted carrier signal point is compared with the predecided reference value. Based on the compared result, the control value for transmission power is generated at the next power control and then is transmitted to the mobile phone. The transmission power is executed by using the predicted values, so that the control for transmission power can follow a faster fading and thereby reduce the control error for transmission power. The smaller control error for transmission power leads to reducing the influence of the subject mobile phone to the other mobile phones of the other channels with the same frequency, thereby enhancing the utilization efficiency of the frequency.

The mobile communication systems according to the first to the ninth aspects of the invention are arranged to correct the influence of the previous control for transmission power, for preventing an oscillating phenomenon caused by the transmission power control against the very gradual fading. Further, these mobile communication systems utilize the prediction. Hence, if the control interval is made longer, the control can follow the fading. It is thus effective in suppressing the increase of the control error for the transmission power against the intermittent transmission according to the variable rate.

The mobile communication system according to the seventh aspect of the invention provides the "carrier signal point detector", the "amplitude corrector", and the "predicting unit" located on each path. Hence, the present invention may apply to the receiver where the RAKE combine is executed.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

The present invention will be discussed in detail along the embodiments.

Figure 1:
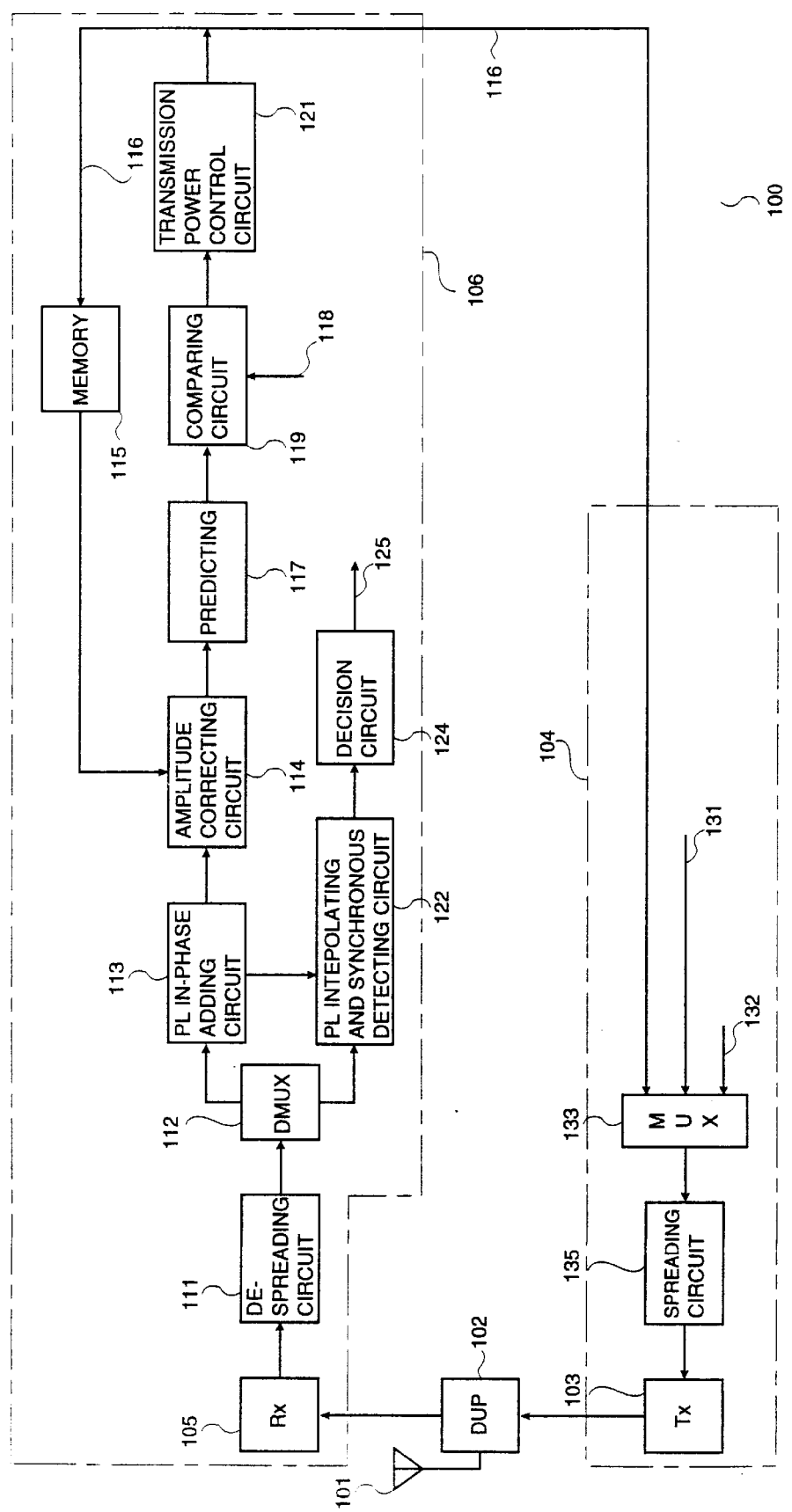
FIG. 1 is a block diagram showing a transceiver unit of a base station located in a mobile communication system according to an embodiment of the present invention.

FIG. 1 shows a transceiving section of a base station included in a mobile communication system according to an embodiment of the present invention. This mobile communication system operates to communicate data between a base station and each mobile phone through the effect of the code divisional multi access system.

The transceiver section 100 of the base station includes an antenna 101, a duplextor 102 connected to this antenna 101, a transmitting section 104 representatively containing a radio transmitter 103, and a receiving section 106 representatively containing a radio receiver 105.

The radio receiver 105 contained in the receiving section 106 operates to convert a received signal on a radio band into a Complex baseband signal. The Complex baseband signal is composed of an in-phase component and an quadrature component. The Complex baseband signal is applied to an de-spreading circuit 111. The de-spreading circuit 111 replicates a code divisional multiplexed Complex baseband signal for extracting a signal of the subject channel. The output of the de-spreading circuit 111 is applied to a de-multiplexing circuit 112. The de-multiplexing circuit 112 operates to separate the input signal into a pilot symbol (PL) and data. The pilot symbol is applied to a pilot symbol in-phase adding circuit 113.

The pilot symbol in-phase adding circuit 113 is a circuit for enhancing SN rato of the pilot symbol by performing an in-phase addition of the plural pilot symbols received in sequence. The output of the pilot symbol in-phase adding circuit 113 is applied to an amplitude correcting circuit 114. The amplitude correcting circuit 114 is inputted with the previous transmission power control bit 116 read from a memory 115 and corrects the amplitude of the pilot signal according to the control value of the previous transmission power. The transmission power control bit is a bit for indicating the increase or decrease of the transmission power of the mobile phone. A predicting circuit 117 operates to perform an extrapolation or a linear prediction of the pilot symbols whose current and previous amplitudes are corrected on the I/Q plane, for predicting a pilot signal at the slot when the transmission power is controlled. On the I/Q plane, the in-phase component is represented by an axis of real number and the quadrature component is represented by an axis of imaginary number.

The amplitude of the pilot symbol predicted by the predicting circuit 117 and a reference value 118 of the amplitude are applied to a comparing circuit 119 for comparing both with each other. The compared result is applied to a transmission power control circuit 121 in which the transmission power control bit 116 is generated. This bit 116 is stored in the memory 115.

On the other hand, the data separated by the de-multiplexing circuit 112 is applied into a pilot symbol interpolating and synchronous detecting circuit 122. The circuit 122 operates to interpolate the in-phase added pilot symbols located at both ends of the slot, for deriving a reference signal for coherent detection. The detected signal from the detecting circuit 122 is applied into a decision circuit 124 for deciding the signal. Then, the received data 125 is output from the decision circuit 124.

On the other hand, the transmitting section 104 provides a multiplexing circuit (MUX) 133 for being inputted with the transmitted data 131 and the transmission power control bit 116. The multiplexing circuit 133 operates to time-divisionally multiplex these three inputs and then apply the result to the spreading circuit 135. The spreading circuit 135 performs a spread spectrum with the spreading codes. The output of the spreading circuit 135 is applied to the radio transmitting section 103 in which the baseband signal is converted into a radio band signal and then amplified. The resulting signal is transmitted at the antenna 101 through the duplextor 102.

The comparing circuit 119 operates to compare the power of the received signal for the predicting circuit 117 with the reference power. As is used in the prior art such as the North America standard system with the code divisional multi access, the rate of the received signal to the power (sum of the noise power and the interference power) with compared with the predecided reference value. The decision circuit 124 enables to decide if the data is "0" or "1" based on a signal polarity. In order to enhance the communication equality, the combination of the de-interleave and the error correction (soft decision (Viterbi) decoder for doping error correction with a multi-valued signal) with the decision is made possible.

Figure 2:
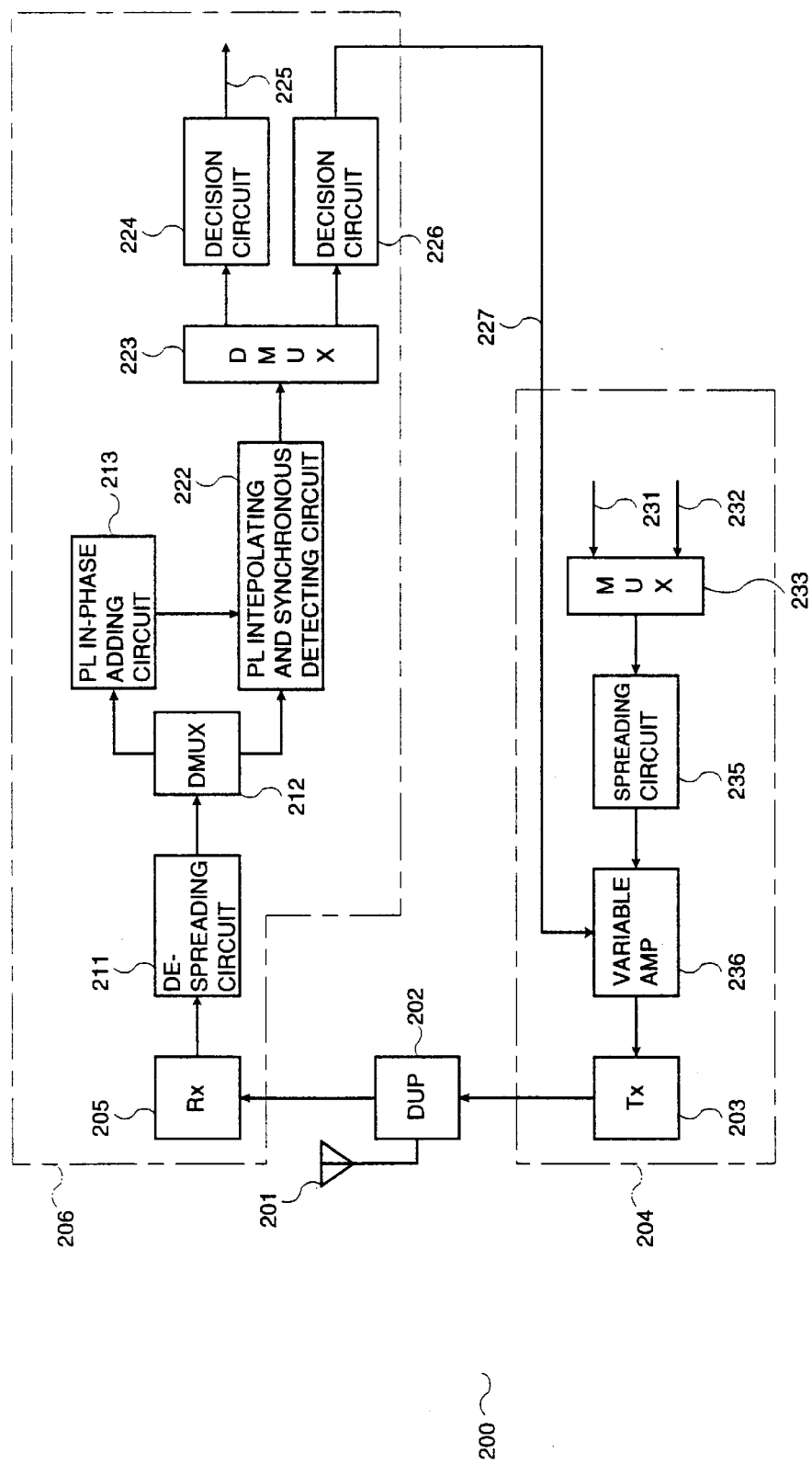
FIG. 2 is a block diagram showing a transceiver unit of a mobile phone located in the mobile communication system according to the embodiment.

FIG. 2 shows the transceiving section of the mobile phone included in the mobile communication system according to this embodiment. The transceiving section 200 includes an antenna 201, a duplextor 202 connected to this antenna 201, a transmitting section 204 representatively containing a radio transmitter 203, and a receiving section 206 representatively containing a radio receiver 205.

The radio receiver 206 of the receiving section 206 operates to convert the received signal on a radio band into the Complex baseband signal. The Complex baseband signal is composed of the in-phase component and the quadrature component. This Complex baseband signal is applied to a de-spreading circuit 211. The de-spreading circuit 211 operates to reversely diffuse the code divisional and multiplexed Complex baseband signal for extracting the signal of the subject channel. The output of the de-spreading circuit 211 is applied to a first de-multiplexing circuit 212. The first de-multiplexing circuit 212 operates to separate the input signal into a pilot symbol (PL) and data. The pilot symbol is applied to a pilot symbol in-phase adding circuit 213.

The pilot symbol in-phase adding circuit 213 is a circuit for enhancing S/N rato of the pilot symbol by performing an in-phase addition of the pilot symbols received in time series.

On the other hand, the data separated by the first de-multiplexing circuit 212 is applied to a pilot symbol interpolating and synchronous detecting circuit 222. The circuit 222 operates to interpolate the in-phase added pilot symbols at both ends of the slot for deriving a reference signal for coherent detection. The detected signal output from the interpolating and synchronous detecting circuit 222 is applied to a second de-multiplexing circuit 223, in which the detected signal is separated into a data portion and a transmission power control bit portion. The data portion is applied to a first decision circuit 224 in which it is decided. Then, the circuit 224 outputs the received data 225. The transmission power control bit is applied to a second decision circuit 236 in which the bit is decided. Then, the circuit 226 outputs a transmission power control bit 227.

The transmitting section 204 includes a multiplexing circuit (MUX) 233 for being inputted with the transmitted data 231 and the pilot symbol 232. The multiplexing circuit 233 operates to time-divisionally multiplex there two inputs and then apply the results into a spreading circuit 235. The spreading circuit 235 performs a spread spectrum with the spreading codes. The output of the spreading circuit 235 is applied to a variable amplifier 236. The variable amplifier 236 operates to increase or decrease the transmission power according to the transmission power control bit 227 output from the second decision circuit 226. Hence, the variable amplifier 236 may be composed of a variable attenuator. The output of the variable amplifier 236 is applied to a radio transmitter 203. The radio transmitter 203 operates to convert the baseband signal into a radio band signal and amplify the radio band signal. The amplified signal is transmitted from the antenna 201 through the duplextor 202.

Figure 3:
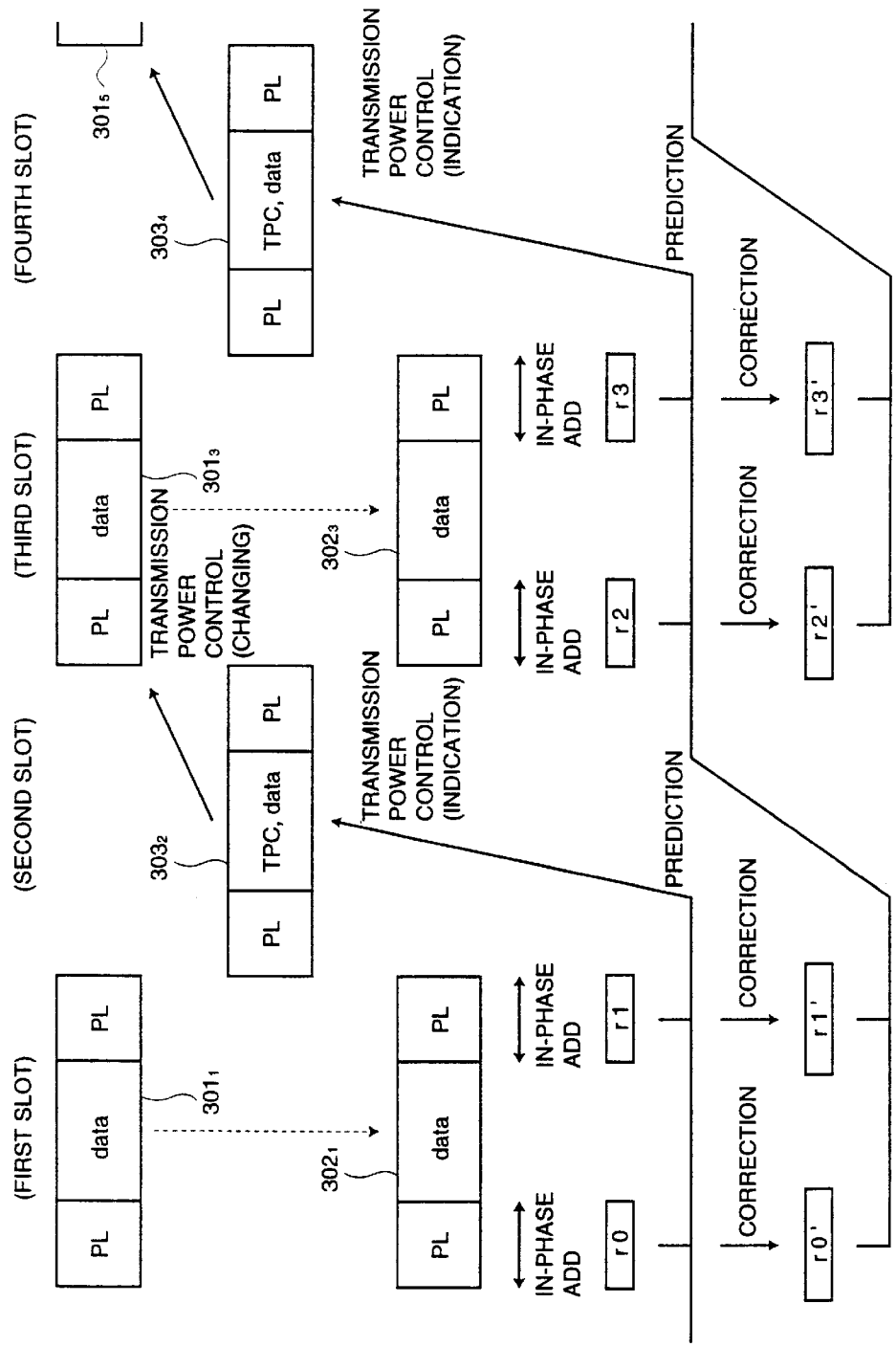
FIG. 3 is an explanatory view showing data exchange between the mobile phone and the base station included in the mobile communication system according to the embodiment, and operating timing of the circuits of the base station.

FIG. 3 shows how data is transferred between the mobile phone and the base station provided in the mobile communication system according to this embodiment and the operating timings of the circuits provided the base station. For simplifying the description, FIG. 3 shows the case of a single transmission for two slot, that is, the case of transmitting and receiving data at a half of the maximum bit rate. In actual, the mobile communication system of this embodiment enables to do continuous transmission and communicate data at a lower rate than the half of the maximum bit rate. This may be similarly represented in a diagrammatic manner.

In the transmission signals $301_1$, $301_3$, . . . of each slot transmitted from the mobile phone, the receive signals $302_1$, $302_3$, . . . of each slot at the base station, and the transmission signals $303_2$, $303_4$, . . . of each slot transmitted from the base station, the subscripts of "1", "2", "3", and so forth represent the number of the slot. As is understood from FIG. 3, the signal 301 to 303 of each slot is formatted to have the pilot symbols (PL) located at both ends of each slot and data located between the pilot symbols. This format is employed to facilitate the pilot symbol interpolation coherent detection.

To specify the control delay for transmission power as 2 slots, the transmission for the base station is shifted by about one slot from the transmission from the mobile phone. The receive signal $302_1$ of the first slot in the base station is separated into the pilot symbols and the data through the effect of a de-multiplexing circuit 112. The pilot symbols located at both ends of the slot are in-phase added to each other. The added result is represented as "r0" and "r1" at the first slot of FIG. 3 and as "r2" and "r3" of the third slot. About the fifth or later slots, the added results are similarly represented though they are not shown.

In a case that a symbol rate is far faster than the fading frequency of the transmission path, it is considered that substantially no variation of a carrier phase or amplitude takes place between the symbols located adjacently. By performing an in-phase addition of the adjacent pilot symbols, therefore, the S/N power rate of the resulting pilot symbol is improved by the added symbols. These in-phase added pilot symbols "r0, r1, r2, r3, . . ." may be considered as signals for representing on the I/Q plane (in-phase component and quadrature component) a carrier amplitude and phase at a time when each pilot symbol is received.

In a case that no control for transmission power is executed and the power transmitted from the mobile phone is made constant at each slot, it may indicate that the received pilot symbol represents the variation of the transmission path. If an interval between the pilot symbols, that is, the slot length may be considered to be far shorter than the fading frequency, the trace of the pilot symbols depicts a smooth curve. However, the mobile phone having a code divisional multi access system operates to control the transmission power. Hence, the trace of the received pilot symbols cannot be represented as a smooth curve.

In order to eliminate the adverse effect of the control for the power transmitted by the mobile phone and thereby represent only the variation of the transmission path, the mobile communication system of this embodiment operates to correct the amplitude of the received pilot symbol according to the history of the previous controls for the transmission power. For example, at the third slot shown in FIG. 3, the variation of the transmission path at the fifth slot is predicted by using the pilot signals "r0" and "r1" at the current slot (the third slot in this case) and the pilot signals "r2" and "r3" at the slot earlier than the current slot by two slots, that is, at the first slot.

Assume that the power transmitted by the mobile phone at the current slot, that it, at the third slot is made lower by 1 dB than the power transmitted by the mobile phone at the first slot, which is earlier by two slots than the third slot. In this assumption, by correctively changing the pilot signals "r0" and "r1" received at the third slot to "r0'" and "r1'" whose amplitudes are raised by 1 dB, it is possible to eliminate the adverse effect of the control for the transmission power about all the pilots used for prediction. The corrected pilot signals "r0'" and "r1'" whose amplitudes are corrected and the pilot signals "r2" and "r3" are used for extrapolating or linearly predicting the pilot signal dots on the I/Q plane at the slot that is later by two slots than the third slot, that is, the fifth slot. By comparing the predicted power value with the reference value, the transmission power control bit 116 (see FIG. 1) is generated in a manner to reduce the difference to a minimum. This transmission power control bit 116 is transmitted from the base station to the mobile phone at the next slot to the third slot, that is, the fourth slot. The mobile phone operates to increase or decrease the transmission power of the next slot to the fourth slot, that is, the fifth slot in response to an indication given by the received transmission power control bit.

Figure 4:
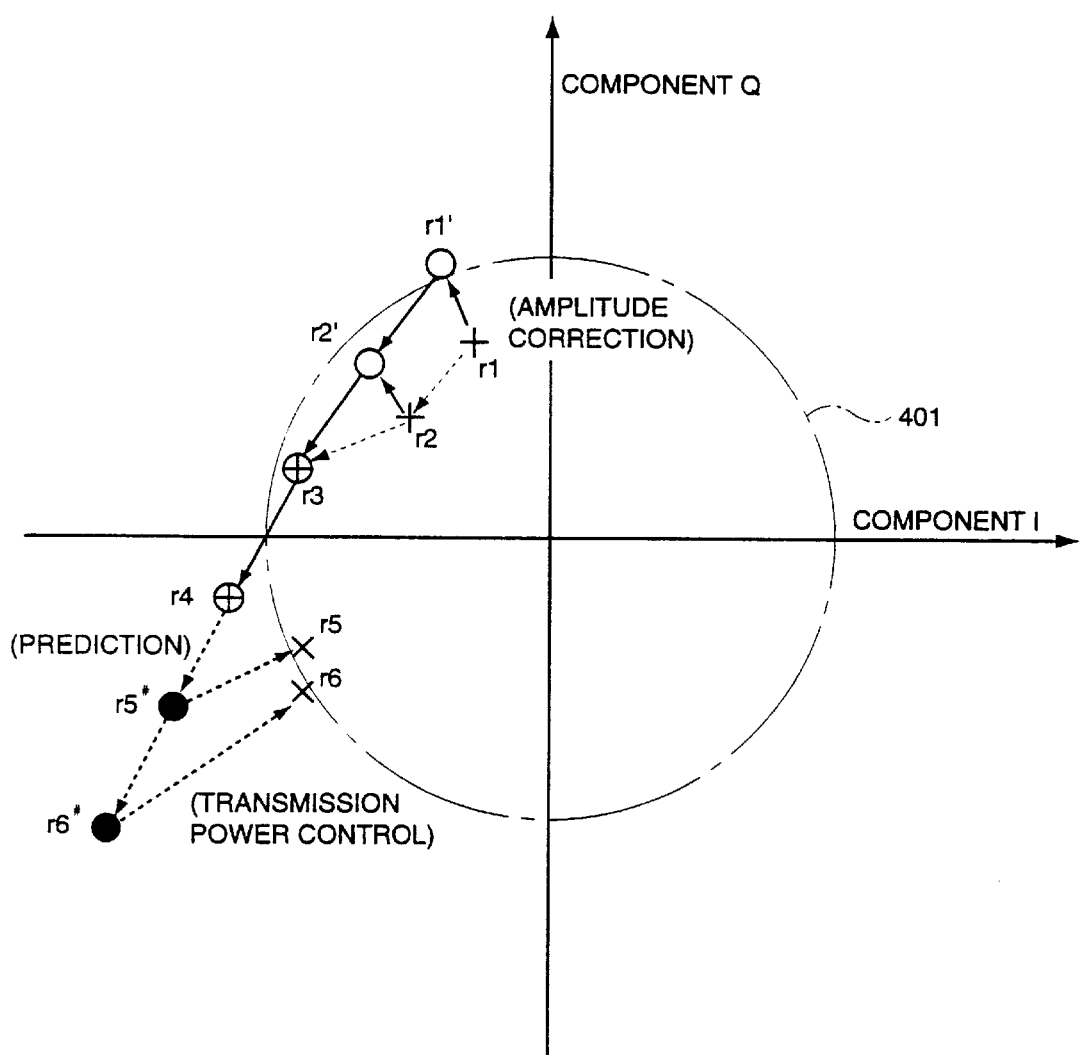
FIG. 4 is an explanatory view showing the amplitude correction and the prediction on the I/Q plane according to this embodiment of the invention.

FIG. 4 is an explanatory view showing the amplitude correction and the prediction on the I/Q plane executed in this embodiment. In FIG. 4, an axis of abscissa denotes an I component as an in-phase component and an axis of ordinance denotes a Q component as an quadrature component. A circle 401 indicated by an alternate long and short dash line indicates a reference value for the control for the transmission power. The pilot symbol (in-phase added symbol) at the first slot is represented by "r1" and "r2". The pilot symbol at the third slot is represented by "r3" and "r4". The transmission power is controlled between the first and the third slots. This control leads to changing the power transmitted by the mobile phone. Hence, the amplitudes of the pilot symbols "r2" and "r3" are discontinuous.

In FIG. 4, it is assumed that the pilot symbols "r1'" and "r2'" are the pilot symbols "r1" and "r2" whose amplitudes are corrected and the power transmitted by the mobile phone at the first slot is equivalent to the power transmitted by the mobile phone at the third slot. By correcting the amplitudes, it is possible to eliminate the adverse effect of the control for the power transmitted by the mobile phone. The trace of the pilot symbol depicts a smooth curve as indicated by the continuous arrows of FIG. 4. "r5#" and "r6#" are the pilot symbols at the fifth slot predicted by using the pilot symbols "r1'", "r2'", "r3", and "r4". These pilot symbols "r5#" and "r6#" are greatly shifted out of the reference values indicated by the circle 401. Hence, the control is executed so that the transmission power of the mobile phone at the fifth slot is made lower. This control hence enables to make the pilot symbols "r5" and "r6" actually received at the fifth slot closer to the reference values indicated by crosses on the circle 401.

The control for the transmission power through the effect of the conventional code divisional multi access system has been executed to measure only the received level at the third slot, compare the measured value with the reference value in magnitude, and correct the power transmitted by the mobile phone based on the compared result. Assuming that this conventional method is applied to the case shown in FIG. 4, the pilot symbols "r3" and "r4" substantially coincide with the points on the circle 401, so that the received level at the third slot substantially coincides with the reference value as well. Hence, an indication is given for not changing the transmission power at the fifth slot. As a result, the received power at the fifth slot is made to be the values indicated by the pilot symbols "r5#" and "r6#", which are greatly shifted from the reference values. Hence, the actually received power at the fifth slot greatly interferes with another channel.

By the way, various kinds of methods may be employed for predicting a pilot signal at the next slot using the pilot symbols whose amplitudes are corrected. The mobile communication system of this embodiment employs the below-indicated method (1) but may employ the methods (2) and (3) in place.

(1) Predicting method by linear extrapolation using the pilot symbols located at both ends of one slot.

(2) Predicting method by obtaining a straight line of an error of least squares of the latest received N pilot symbols whose amplitudes are corrected and extrapolating the straight lines.

(3) Predicting method by linear prediction using the latest received N pilot symbols whose amplitudes are corrected. This method employs the error of least squares of the previous short-time pilot symbols.

Hereafter, these methods will be described. For simplifying the description, it is assumed that the in-phase added pilot symbols are obtained at regular intervals. The n-th pilot symbol is "r(n)" and the predicted value is "r(n)#". The "r(n)" and "r(n)#" are complex numbers. Hence, for representing these components individually, the subscript I is added to the in-phase component and the subscript Q is added to the quadrature component. That is, these complex numbers are represented as follows.

$$(r)n) = r_I(n) | j \times r_Q(n)$$

$$r(n)\# = r_I(n)\# + j \times r_Q(n)\#$$

The linear extrapolation using the pilot symbols located at both ends of one slot, as indicated in (1) employed in this embodiment, can perform the prediction most easily.

$$r(n)\# = 2 \times r(n-1) r(n\ 2)$$

The description will be oriented to the predicting method for obtaining a straight line of errors of least squares of the latest received N pilot symbols whose amplitudes are corrected and extrapolating the straight line, as indicated in (2). This straight line of errors of least squares is obtained by deriving such $a_I$, $b_I$, $a_Q$, and $b_Q$ as reducing the following values to a minimum. That is, for the in-phase component (I component) and quadrature component (Q component), an axis of abscissa is a time and an axis of ordinance is in-phase and quadrature components. On this plane, the linear approximation of least squares is executed. The resulting straight light has a gradient of $-a_I$ (or $a_Q$) and a value of $b_I$ or ($B_Q$) at a time point n.

$$\Sigma_{i=1-N}\{r_I(n-1)-(a_I \times i + b_I)\}^2$$

$$\Sigma_{1=1-N}\{r_Q(n-i)-(a_Q \times i + b_Q)\}^3$$

The prediction value may be expressed as follows.

$$r_I(n)\#=b_I=6/N(1\ N)\times\Sigma_{i=1-N}\{r_I(n-i)\times(i-(2N+1)/3\}$$

$$r_Q(n)\#=b_Q=6/N(l-N)\times\Sigma_{l=1-N}\{r_Q(n-i)\times(i=(2N+1)/3\}$$

If N is "2", this coincides with the extrapolating method indicated in (1) employed in this embodiment.

Then, the description will be oriented to the method for linear prediction using the latest received N pilot symbols whose amplitudes are corrected. The predicted values in this method may be represented as follows.

$$r(n)\#=-\Sigma_{i=1-N}\{ai\times r(n-i)\}$$

where "a1, a2, ..., aN" are linear prediction coefficients and are served to reduce the expectation value of an error of least squares. This expectation value is represented as follows.

$$E[|r(n)-r(n)\#|^2]=E[|\Sigma_{i=0-N}\{ai\times r(n-i)\}|]=\Sigma_{i=0-N}\Sigma_{j=0-N}ai^*\times aj\times E[r(n-i)^*\times r(n-j)]$$

where "a0" is 1 and X* represents a conjugate of X.

The linear predictive coefficients can be obtained merely by solving the following N-dimensional simultaneous equations (normal equations).

$$\Sigma_{i=0-N}\{ai\times E[r(n-j)^*\& \times r(n-i)]\}=0; 1=1\sim N$$

Since the short-time transmission path is considered to be steady, the short-time average value may be used in place of the following expectation value.

$$E[r(n-j)^*\times r(n-i)]$$

First Transformation

Figure 5:
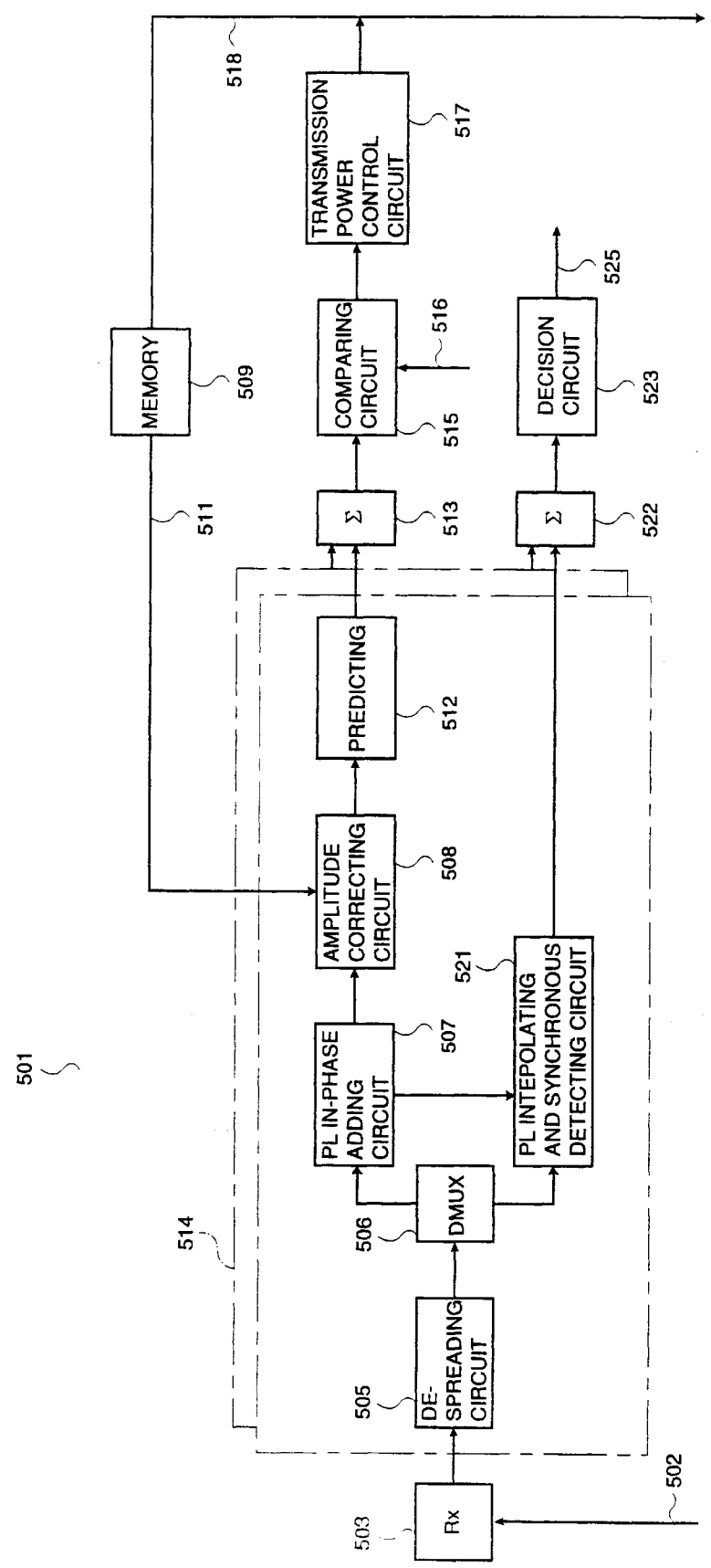
FIG. 5 is a block diagram showing a receiver unit of a base station included in a first transformation of the invention.

FIG. 5 shows a receiving section of the base station provided in the first transformation of the present invention. The arrangements of the transmitting section of the base station and the mobile phone are the same as those of the foregoing embodiment shown in FIG. 1 and 2. Hence, the arrangements are not illustrated herein. The code divisional multi access system provides a capability of doing multi-path diversity using the multi-path characteristic of the transmission path. The receiving section 501 implements the receiver for doing the multi-path diversity (the so-called RAKE receiver).

This receiving section 501 includes a radio receiver 503 for converting a received signal 502 of a radio band into a complex baseband signal composed of an in-phase component and an quadrature component. The complex baseband signal is applied to a de-spreading circuit 505. The de-spreading circuit 505 operates to reversely diffuse the code-divided and multiplexed complex baseband signal for extracting the signal of the subject channel. The output of the de-spreading circuit 505 is applied to a de-multiplexing circuit 506. The de-multiplexing circuit 506 operates to separate the input signal into the pilot symbol (PL) portions and the data portion. The pilot symbols are input to an pilot symbol in-phase adding circuit 507.

The pilot symbol in-phase adding circuit 507 operates to in-phase add the pilot symbols received in time series for enhancing S/N rato of the pilot symbols. The output of the pilot symbol in-phase adding circuit 507 is applied to an amplitude correcting circuit 508. The amplitude correcting circuit 508 is input with the previous transmission power control bit (TPC bit) 511 obtained from a memory 509 and operates to correct the amplitude of the pilot symbol according to the control value of the previous transmission power.

The predicting circuit 512 operates to extrapolate or linearly predict on the I/Q plane the pilot symbol whose current and previous amplitudes are corrected, for preciting the pilot signal at the slot for controlling the transmission power.

The output of the predicting circuit 412 is applied to a first combining circuit 513. The first combining circuit 513 operates to calculate a sum of powers of the pilot symbols predicted by plural RAKE fingers 514, each RAKE finger 514 including the de-spreading circuit 505, the de-multiplexing circuit 506, the pilot symbol in-phase adding circuit 507, and the predicting circuit 512, those of which are described above, and a pilot symbol interpolation synchronous detecting circuit 521 which will be described below. The output of the first combining circuit 513 is applied to a comparing circuit 515. The comparing circuit 515 operates to compare the sum with a reference value 516. The compared result is sent to a transmission power control circuit 517 in which a transmission power control bit 518 is generated. The bit 518 is a bit for indicating the increase or decrease of the transmission power of the mobile phone. The bit 518 is stored in the memory 509.

On the other hand, the data separated by the de-multiplexing circuit 506 is input to the pilot symbol interpolation synchronous detecting circuit 521. This circuit 521 operates to interpolate the pilot symbol derived by performing an in-phase addition of the pilot symbols located at both ends of the slot and provide the interpolated result as a reference signal for coherent detection. The detected signal output from the detecting circuit 421 is applied to a second combining circuit 522. The second combining circuit 522 performs a diversity combine of the detected signals from all the RAKE fingers 514. The combined signal is sent from the second combining circuit 522 to a decision circuit 523 for detecting the combined detected signal. Then, the circuit 523 operates to output the received data 525.

If the present invention is applied to the RAKE receiver provided in the first transformation, each RAKE finger performs the same process as above.

Second Transformation

Figure 6:
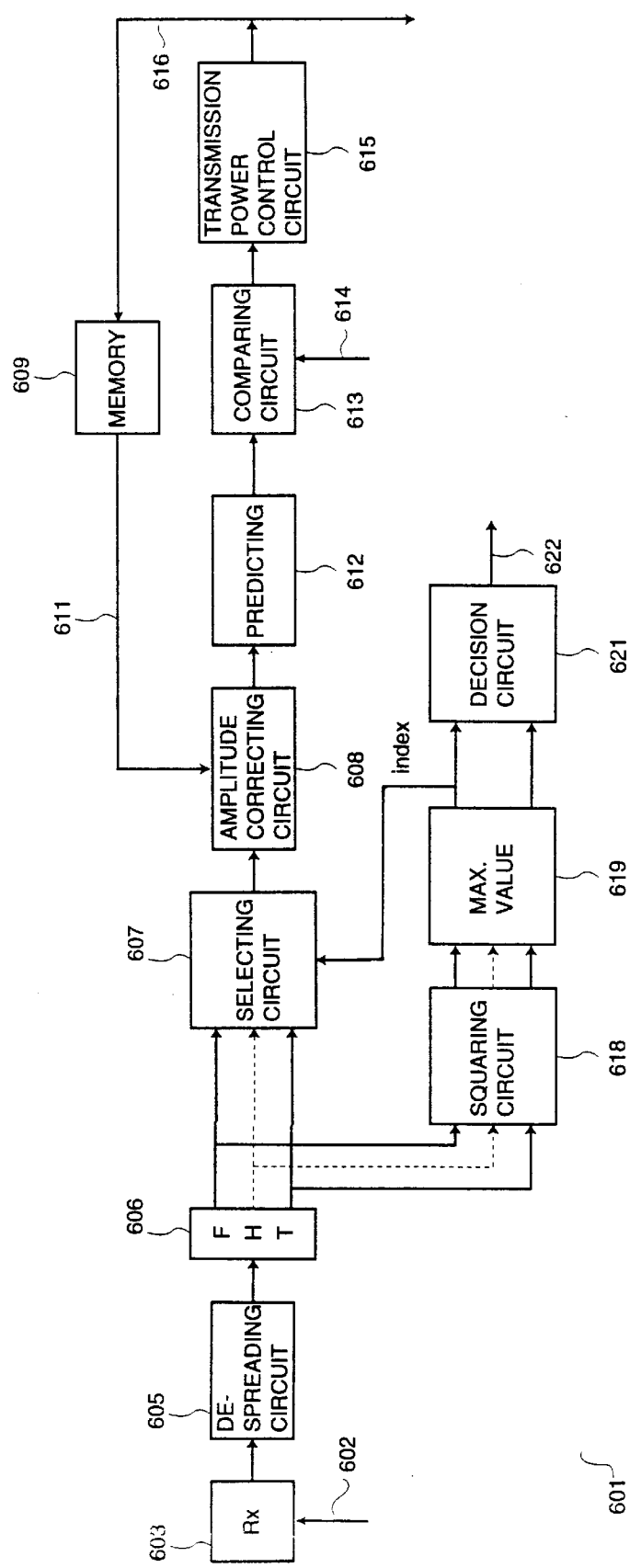
FIG. 6 is a block diagram showing a receiver unit of a base station included in a second transformation of the invention.

FIG. 6 shows a receiving section of the base station provided in the second transformation of the present invention. The description about the foregoing embodiment and the first transformation has been concerned with the case of receiving the signal composing the pilot symbols (PL) buried at both ends of each slot. The second transformation of the invention is an application of the present invention to the North American standard system (TIA IS95) having the aforementioned code divisional multi access system. On the up link from the mobile phone to the base station in this North America standard system, the signal is 64-ary quadrature modulated by using 64 or $2^6$ Walsh codes and then is diffused by using PN (Pseudo Noise) codes. This North American standard system does not provide the pilot symbols added on each slot. Hence, this system disables to do the pilot symbol based prediction. However, the 64-ary quadrature modulation with 6 bits as one symbol serves to increase the S/N power rate for one symbol. It means that the data symbol based prediction is made possible. Herein, the description about the second transformation of this invention has concerned with the case that the signal length is 64. The signal length is not necessarily limited to this value. In general, a greater value may give rise to the preferable result.

The receiving section 601 of the base station shown in FIG. 6 provides a radio receiver 603 for converting a received signal 602 of a radio band into a complex baseband signal composed of an in-phase component and an quadrature component. The complex baseband signal is applied to a de-spreading circuit 605. The de-spreading circuit 605 operates to reversely diffuse the code-divided and multi-plexed complex baseband signal for extracting a signal of the subject channel. The output of the de-spreading circuit 605 is applied to a fast Hadamard transform circuit 606. This circuit 606 operates to derive the correlation values (64 signals) with 64 Walsh codes. Then, a selecting circuit 607 operates to select one signal having the maximum power.

In turn, an amplitude correcting circuit 608 operates to correct the amplitude of the correlation value selected by the selecting circuit 607 according to a transmission power control bit 611. The bit 611 indicates the previous transmission power control values read from a memory 609. The output of the amplitude correcting circuit 608 is input to a predicting circuit 612. The predicting circuit 612 operates to extrapolate or linearly predict the correlation value signal whose current and previous amplitudes are corrected on the I/Q plane, concretely, the in-phase component on the real number axis and the quadrature component on the imaginary number axis, and predict a signal point at the slot where the transmission power is controlled. The amplitude of the predicted signal point is applied to a comparing circuit 613 in which the amplitude is compared with a reference value 614. A transmission power control circuit 615 operates to generate a transmission power control bit 616 for indicating the increase or decrease of the transmission power of the mobile phone based on the compared result. This bit 616 is stored in a memory 609. This bit 611 is used in the amplitude correcting circuit 609. This bit 611 is used in the amplitude correcting circuit 608 as well as is supplied to a transmitting section (not shown) from which the bit is transmitted to the mobile phone.

On the other hand, the output of the fast Hadamar transform circuit 606 is also input to a squaring circuit 618. The squaring circuit 618 operates to calculate a power about each of the input 64 correlation values. A maximum value detecting circuit 609 operates to detect a maximum power of the calculated powers and supply an index of the correlation value of the maximum power. The maximum value and the index are input to a decision circuit 621 in which they are decided. Then, the circuit 621 operates to output the received data 622. This decision circuit 621 contains a de-interleaving circuit and a soft decision Viterbi decoder. The index of the correlation value is supplied to a selecting circuit 607 in which the index is used for the selection.

The mobile communication system of the second transformation is different from the foregoing embodiment and the first transformation in that the correlation value for the maximum amplitude is used in place of the in-phase added pilot symbols but is the same as them in the amplitude correction and the prediction. Like the first transformation, the mobile communication system may apply to the RAKE receiver.

Many wisely different embodiments of the present invention may be constructed without departing spirit and scope of the present invention. It should be understood that the present invention is not limited to the specific embodiments described in the specification, except as defined in the appended claims.

What is claimed is:

1. A mobile communication system comprising:
    a base station; and
    a plurality of mobile devices;
    wherein said base station comprises:

means for detecting a carrier signal point represented by an in-phase component and a quadrature component at regular intervals;

means for correcting an amplitude of said carrier signal point detected by said detecting means according to previous transmission power control values;

means for predicting a carrier signal point at a time point when next control for transmission power is executed by using said carrier signal point whose amplitude is corrected by said correcting means;

means for comparing an electric power of said carrier signal point predicted by said predicting means with a predecided reference value;

means for generating a control value for said transmission power at said time point when said next control for transmission power is executed, based on said compared result given by said comparing means;

a memory for storing said control value for transmission power generated by said generating means and supplying said previous control values for transmission power to said correcting means;

means for transmitted said control value for transmission power; and wherein said plurality of mobile devices are connected to said base station through a radio wave of one frequency so that said mobile devices are controlled to keep signal electric powers received by said base station identical with each other according to said control value for transmission power transmitted from said base station.

2. The mobile communication system as claimed in claim 1, wherein said means for detecting said carrier signal point comprises means for detecting said carrier signal point by detecting pilot symbols inserted at regular periods.

3. The mobile communication system as claimed in claim 1, wherein said means for detecting said carrier signal point comprises means for detecting said carrier signal point by detecting an M-valued quadraturely modulated data signal point.

4. The mobile communication system as claimed in claim 1, wherein said predicting means comprises means for deriving said predicted value by interpolating amplitude corrected values of the latest received two carrier signal points.

5. The mobile communication system as claimed in claim 1, wherein said predicting means comprises means for deriving said predicted value by performing a linear prediction of least squares with respect to amplitude corrected values of the latest received carrier signal points.

6. The mobile communication system as claimed in claim 1, wherein said predicting means comprises means for deriving said predicted value by performing a linear prediction of least squares with respect to amplitude corrected values of the latest received plural carrier signal points.

7. A mobile communication system for doing communications in a direct diffuse code divisional multi access system, comprising:
    a base station; and
    a plurality of mobile devices;
    wherein said base station comprises:

means for detecting a carrier signal point composed of an in-phase component and a quadrature component of a path at regular intervals, said detecting means being prepared for each of plural paths of radio signals;

means for correcting an amplitude of said carrier signal point detected by said detecting means according to previous control values for a transmission power, said correcting means being prepared for each of said paths and in correspondence to said detecting means;

means for predicting a carrier signal point at a time when next control for said transmission power is executed by using said carrier signal point whose amplitude is corrected by said correcting means, said predicting means being provided in correspondence to each of said correcting means;

means for combining electric powers of said carrier signal points predicted by said predicting means;

means for comparing said electric power combined by said combining means with a predecided reference value;

means for generating a control value for said transmission power at a time point when said next control for said transmission power is executed, based on said compared result given by said comparing means;

a memory for storing said control value for said transmission power generated by said generating means and supplying said control value as said previous control values for said transmission power to said correcting means; and a control circuit for controlling said transmission power, said control circuit having means for transmitting said control value for said transmission power; and wherein said plurality of mobile devices are connected to said base station through radio waves of one frequency so that said mobile devices are controlled to keep signal electric powers received by said base station identical with each other according to said control value for transmission power transmitted from said base station.

8. A mobile communication system for doing communications in a direct diffuse code divisional multi access system, comprising:

a base station; and a plurality of mobile devices;

wherein said base station comprises:

radio wave receiving means for receiving a signal of a radio band and converting said signal into a complex baseband signal;

de-spreading means for extracting a signal of a subject channel by replicating diffuse codes of said complex baseband signal code-divided and multiplexed after said conversion;

de-multiplexing means for separating an output of said de-spreading means into pilot symbols and data symbols;

means for performing an in-phase addition of said adjacent pilot symbols received in time series from said de-multiplexing means, for enhancing S/N rato;

means for correcting an amplitude of said in-phase added pilot symbol according to previous control values for transmission power;

means for predicting a received signal point of said pilot symbol at a time when next control for transmission power is executed by said pilot symbol whose amplitude is corrected by said correcting means;

means for comparing a received electric power of said piolot symbol predicted by said predicting means with a predecided reference value;

means for generating a control value for transmission power at a time when said next control for transmission power is executed, based on said compared result given by said comparing means;

a memory for storing said control value for transmission power generated by said generating means and supplying said control value as said previous control values for transmission power to said correcting means; and a circuit for controlling said transmission power, said circuit having means for transmitting said control value for transmission power; and wherein said plurality of mobile devices are connected to said base station through a radio waves of one frequency so that said mobile devices are controlled to keep the signal electric powers received by said base station identical with each other according to said control value for transmission power.

9. A mobile communication system for doing communications in a direct diffuse code divisional multi access system and an M-valued quadrature modulate system, comprising:

a base station; and a plurality of mobile devices;

wherein said base station comprises:

radio wave receiving means for receiving a signal of a radio band and converting said signal into a complex baseband signal;

de-spreading means for extracting a signal of a subject channel by replicating diffuse codes of said complex baseband signal code-divided and multiplexed after said conversion;

quadrature modulating means for calculating a correlation value of said complex baseband signal with each of M quadrature codes, M is a positive integer;

means for selecting one of said M correlation values so that said selected value gives rise to a maximum electric power;

means for correcting an amplitude of said correlation value selected by said selecting means according to previous control values for transmission power;

means for predicting a signal point at a time point when next control for transmission power is executed by said amplitude corrected correlation value;

means for comparing an amplitude of said predicted signal point with a predecided reference value;

means for generating a control value for transmission power at a time point when said next control for transmission power is executed, based on said compared result given by said comparing means;

a memory for storing said control value for transmission power generated by said generating means and supplying said control values as said previous control values for transmission power to said amplitude correcting means; and a circuit for controlling said transmission power, said circuit having means for transmitting said control value for transmission power; and wherein said plurality of mobile devices are connected to said base station through radio waves of one frequency so that said mobile devices are controlled to keep said signal electric powers received by said base station identical with each other according to said control value for transmission power transmitted by said base station.

10. A method for controlling transmission power in a mobile communication system, comprising the steps of:

detecting a carrier signal point represented by an in-phase component and a quadrature component at regular periods;

correcting an amplitude of said detected carrier signal point by referred to stored previous control values for said transmission power;

predicting a carrier signal point at a time when the next control for transmission power is executed by using said carrier signal point whose amplitude is corrected;

comparing an electric power of said predicted carrier signal point with a predecided reference value;

generating a control value for transmission power at said time when the next control for transmission power is executed, based on said compared result;

storing said generated control value for transmission power as a previous control value for transmission power; and transmitting said control value for transmission power to plural mobile devices connected through radio waves of one frequency and controlling said transmission power in a manner to keep said transmission powers received by a base station equal to each other, based on said control value for transmission power.

11. The control method for transmission power in a mobile communication system as claimed in claim 10, wherein the step of detecting said carrier signal point comprises a step of detecting said carrier signal point by detecting each of pilot symbols inserted at regular periods.

12. The control method for transmission power in a mobile communication system as claimed in claim 10, wherein the step of detecting said carrier signal point comprises a step of detecting said carrier signal point by detecting a data signal point which is subject to the M-valued quadrature modulation.

13. The control method for transmission power in a mobile communication system as claimed in claim 10, wherein the step of detecting said carrier signal point comprises a step of deriving a predictive value by extrapolating amplitude-corrected values of the latest received two carrier signal points.

14. The control method for transmission power in a mobile communication system as claimed in claim 10, wherein the step of detecting said carrier signal point comprises a step of deriving a predictive value by performing a straight-line approximation of least square with respect to amplitude-corrected values of the latest received plural carrier signal points.

15. The control method for transmission power in a mobile communication system as claimed in claim 10, wherein the step of detecting said carrier signal point comprises a step of deriving a predictive value by performing a linear approximation of lest square based on amplitude-corrected values of the latest received plural carrier signal points.

16. A control method for transmission power in a mobile communication system, comprising the steps of:

detecting a carrier signal point represented by an in-phase component and a quadrature component on each path at regular periods;

correcting an amplitude of said carrier signal point detected on each path, based on previous control value for transmission power;

predicting a carrier signal point at a time when the next control for transmission power is executed by using said carrier signal point whose amplitude is corrected on each path;

adding and combining electric powers at said predicted carrier signal points;

comparing said combined electric power with a predecided reference value;

generating a control value for transmission power at said time when the next control for transmission power is executed, based on said compared result;

storing said generated control value for transmission power as said previous control values for transmission power; and transmitting said control value for transmission power to plural mobile devices connected through radio waves of one frequency and controlling said transmission power in a manner to keep said transmission powers received by a base station equal to each other, based on said control value for transmission power.

17. A control method for transmission power in a mobile communication system for doing communications in a direct spreading code divisional multi access manner, comprising the steps of:

receiving a radio band signal and converting said signal into a complex baseband signal;

extracting a signal of a subject channel by replicating diffuse codes of the complex baseband signal code-divided and multiplexed after the conversion;

separating said extracting signal into a pilot symbol and a data symbol;

performing an in-phase addition of adjacent pilot symbols input in series for improving an S/N power ratio;

correcting an amplitude of said in-phase added pilot symbol according to previous control values for transmission power;

predicting a receive signal point of said pilot symbol at a time when the next control for transmission power is executed by using said corrected pilot symbol;

comparing said predicted receive electric power of said pilot symbol with a predecided reference value;

generating a control value for transmission power at said time when the next control for transmission power is executed, based on said compared result;

storing said generated control value for transmission power as a previous control value for transmission power; and transmitting said control value for transmission power to plural mobile devices connected through radio waves of one frequency and controlling said transmission power in a manner to keep said transmission powers received by a base station equal to each other, based on said control value for transmission power.

18. A control method for transmission power in a mobile communication system for doing communications in a direct diffuse code divisional multi access manner and M-valued quadrature modulation manner, comprising the steps of:

receiving a radio band signal and converting said signal into a complex baseband signal;

extracting a signal of a subject channel by reversely spreading said complex baseband signal code-divided and multiplexed after conversion;

calculating a correlative value between said complex baseband signal and each of M quadrature codes, M being a positive integer;

selecting a value for derving a maximum electric power from M correlative values;

correcting an amplitude of said selected correlative value, based on a previous control value for transmission power;

predicting a signal point at a time when the next control for transmission power is executed by using said amplitude-corrected correlative value signal;

comparing an amplitude of said predicted signal point with a predecided reference value;

generating a control value for transmission power at said time when the control for transmission power is executed, based on said compared result;

storing said generated control value for transmission power as said previous control value for transmission power; and transmitting said control value for transmission power to plural mobile devices connected through radio waves of one frequency and controlling said transmission power in a manner to keep said transmission powers received by a base station equal to each other, based on said control value for transmission power.

* * * * *